(12) United States Patent
Ejiri

(10) Patent No.: US 6,244,563 B1
(45) Date of Patent: Jun. 12, 2001

(54) AUTOMATIC TWO-STAGE SWITCHING VALVE

(75) Inventor: Takashi Ejiri, Tokyo (JP)

(73) Assignees: Fujikura Rubber Ltd., Tokyo; Fujikin Incorporated, Osaka, both of (JP)

( * ) Notice: Subject to any disclaimer, the term of this patent is extended or adjusted under 35 U.S.C. 154(b) by 0 days.

(21) Appl. No.: 09/615,988

(22) Filed: Jul. 14, 2000

(30) Foreign Application Priority Data

Jul. 16, 1999 (JP) .................................................. 11-202741

(51) Int. Cl.[7] .................................................. F16K 31/122
(52) U.S. Cl. ............................ 251/63.6; 251/331; 92/151
(58) Field of Search ........................... 251/63.6, 63, 63.5, 251/331, 62; 92/151

(56) References Cited

U.S. PATENT DOCUMENTS

| | | | |
|---|---|---|---|
| 4,903,939 | * | 2/1990 | Ariizumi et al. ............... 251/63.6 X |
| 4,934,652 | * | 6/1990 | Golden .................................. 251/63.6 |
| 5,007,328 | * | 4/1991 | Otteman .......................... 251/63.5 X |
| 5,673,897 | * | 10/1997 | Crochet et al. ...................... 251/63.6 |

* cited by examiner

*Primary Examiner*—Kevin Lee
(74) *Attorney, Agent, or Firm*—McCormick, Paulding & Huber LLP

(57) ABSTRACT

An automatic two-stage switching valve includes a valve stem which normally closes a fluid passage by a spring force; a cylinder adopted to accommodate the valve stem; a large flow rate piston and a small flow rate piston that are provided on the valve stem and are slidably fitted in the cylinder; a large flow rate pilot pressure chamber formed in the cylinder; a small flow rate pilot pressure chamber formed in the cylinder; a stopper adopted to restrict the movement of the small flow rate piston; a pilot pressure source adopted to apply the pilot pressure simultaneously to both the large and small flow rate pilot pressure chambers; and a restrictor provided in a connection passage that connects the pilot pressure source to the large flow rate pilot pressure chamber.

5 Claims, 2 Drawing Sheets

AUTOMATIC TWO-STAGE SWITCHING VALVE

BACKGROUND OF THE INVENTION

1. Field of the Invention

The present invention relates to an automatic two-stage switching valve in which a large flow rate and a small flow rate can be selectively obtained wherein a smooth transfer from the small flow rate to the large flow rate occurs.

2. Description of the Related Art

In general, in a known fluid system in which the flow rate is switched between a small flow rate (e.g., several cc/min.) and a large flow rate (several L/min.), a valve for the small flow rate and a valve for the large flow rate are provided in parallel, so that the valves are selectively opened. However, in the conventional fluid system, the two valves for the large flow rate and the small flow rate, parallel pipes thereof, and a three-way connector (T-connect or) are indispensable, and hence, the manufacturing cost and the number of the elements are increased, and the cost and space for the piping are also increased. Moreover, upon switching from the small flow rate to the large flow rate, it is necessary to provide a separate flow control valve in order to carry out a smooth change of the flow rate.

SUMMARY OF THE INVENTION

It is an object of the present invention to eliminate the above-mentioned drawbacks of the prior art by providing an automatic two-stage switching valve in which a large flow rate and a small flow rate can be switched by a single valve, wherein during the transfer from the small flow rate to the large flow rate, a change in flow rate occurs smoothly.

To achieve the object mentioned above, according to the present invention, an automatic two-stage switching valve is provided, including a valve stem which normally closes a fluid passage by a spring force; a cylinder adopted to accommodate the valve stem; a large flow rate piston and a small flow rate piston that are provided on the valve stem and are slidably fitted in the cylinder; a large flow rate pilot pressure chamber formed in the cylinder to exert a pilot pressure on the large flow rate piston against the biasing force of the spring force; a small flow rate pilot pressure chamber formed in the cylinder to exert a pilot pressure on the small flow rate piston against the biasing force of the spring force; a stopper adopted to restrict the movement of the small flow rate piston due to the pilot pressure by a predetermined amount; a pilot pressure source adopted to apply the pilot pressure simultaneously to both the large flow rate pilot pressure chamber and the small flow rate pilot pressure chamber; and a restrictor provided in a connection passage that connects the pilot pressure source to the large flow rate pilot pressure chamber.

In an embodiment, the cylinder is provided with an open end, and wherein the stopper is a cap that is screw engaged at the open end of the cylinder.

Preferably, the restrictor restricts the pilot pressure applied to the large flow rate pilot pressure chamber so that the valve stem opens the fluid passage at a small flow rate and then gradually to a large flow rate.

According to another aspect of the present invention, an automatic two-stage switching valve is provided, including a valve stem which opens or closes a fluid passage; a biasing spring for biasing the valve stem in a direction to close the fluid passage; pistons for a large flow rate and a small flow rate, provided on the valve stem at different axial positions; a cylinder in which the pistons for the large flow rate and the small flow rate are slidably fitted; a pilot pressure chamber for the large flow rate, formed in the cylinder to exert a pilot pressure on the piston for the large flow rate in a direction opposite to the biasing direction of the biasing spring; a pilot pressure chamber for the small flow rate, formed in the cylinder to exert a pilot pressure on the piston for the small flow rate in a direction opposite to the biasing direction of the biasing spring; a small flow rate connection passage, for connecting the pilot pressure chamber for the small flow rate to a pilot pressure source; a large flow rate connection passage, for connecting the pilot pressure chamber for the large flow rate to the pilot pressure source; and a restrictor provided in the large flow rate connection passage.

Preferably, a stopping device is further provided for restricting the movement of the piston for the small flow rate when the pilot pressure is introduced in the pilot pressure chamber for the small flow rate, wherein the valve stem is movable relative to the piston for the small flow rate in a valve opening direction when the movement of the piston for the small flow rate is restricted by the stopping device.

The present disclosure relates to subject matter contained in Japanese Patent Application No.11-202741 (filed on Jul. 16, 1999) which is expressly incorporated herein by reference in its entirety.

BRIEF DESCRIPTION OF THE DRAWINGS

The invention will be described below in detail, with reference to the accompanying drawings, in which.

DESCRIPTION OF THE PREFERRED EMBODIMENT

Figure 1:
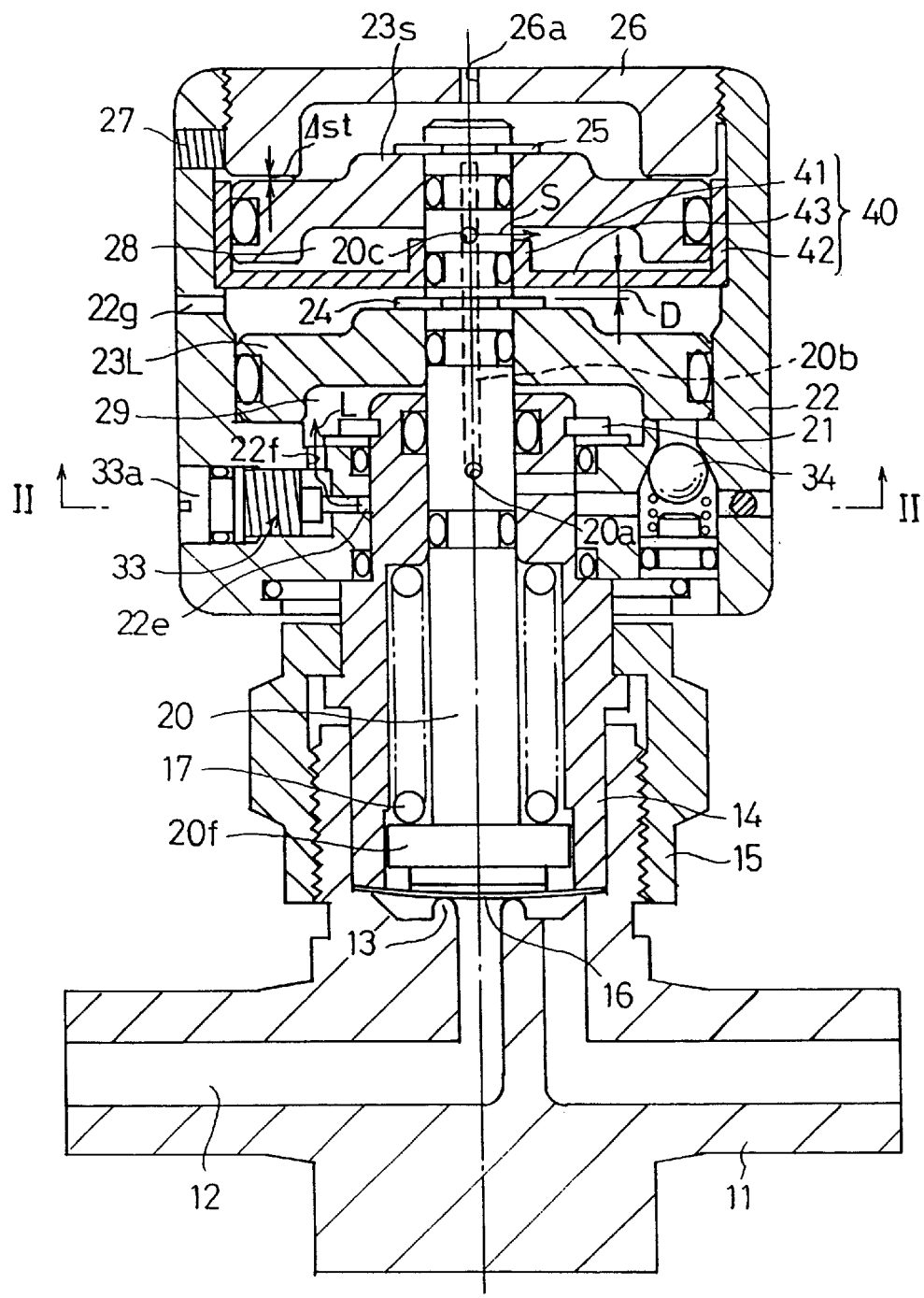
FIG. 1 is a longitudinal sectional view of an embodiment of an automatic two-stage switching valve according to the present invention.

A passage block 11 located in the lower part of FIG. 1 is provided therein with a fluid passageway 12 in which an annular valve seat 13 having an upright axis is formed. A rod holder 14 in which a valve stem 20 coaxial to the annular valve seat 13 is slidably guided is secured to the passage block 11 through a connector sleeve 15. A metal diaphragm 16 in the form of a circular disc is held at the peripheral edge thereof between the lower end of the rod holder 14 and the passage block 11 to open or close the annular valve seat 13. A compression spring 17 is inserted between the rod holder 14 and a flange 20f of the valve stem 20 to bias the valve stem 20 downward to thereby press the metal diaphragm 16 onto the annular valve seat 13 through the valve stem 20. Consequently, the valve stem 20 is continuously biased in a direction to close the annular valve seat 13 through the metal diaphragm 16.

A cylinder 22 is secured to the upper end of the rod holder 14 via a slip-off prevention ring 21. The cylinder 22 is closed at its lower end by the rod holder 14 and has an upper open end. The valve stem 20 extends into the cylinder 22 from the rod holder 14.

A large flow rate piston 23L and a small flow rate piston 23S are relatively slidably fitted on the valve stem 20. The valve stem 20 is also provided with stop rings 24 and 25 fitted thereon to restrict the upward movement of the large flow rate piston 23L and the small flow rate piston 23S, respectively. The stop rings 24 and 25 serve to move the valve stem 20 together with the large and small flow rate pistons 23L and 23S in the valve opening direction (upward direction in FIG. 1) when the large and small flow rate pistons 23L and 23S are moved in the valve opening direction opposite to the direction of the movement of the valve stem 20 by the compression spring 17. The stop rings 24 and 25 do not prevent the downward movement of the large and small flow rate pistons 23L and 23S relative to the valve stem 20.

A cup-shaped separation wall member 40 is fitted in the cylinder 22 and between the large flow rate piston 23L and the small flow rate piston 23S. The cup-shaped separation wall member 40 includes a central cylindrical portion 41 in which the valve stem 23 slides, a peripheral cylindrical portion 42 fitted in and secured to the inner wall of the cylinder 22 and a circular disc portion 43 which connects the central cylindrical portion 41 and the peripheral cylindrical portion 42. A pilot pressure chamber 28 for the small flow rate is formed underneath the small flow rate piston 23S by the small flow rate piston 23S and the cup-shaped separation wall member 40.

A stroke adjustment cap (stopper/stopping device) 26 coaxial to the valve stem 20 is screwed onto the upper open end of the cylinder 22. The stroke adjustment cap 26 restricts (controls) the upward movement of the small flow rate piston 23S. Namely, the distance Δst between the small flow rate piston 23S and the stroke adjustment cap 26 can be adjusted by adjusting the screw engagement position of the stroke adjustment cap 26 with the cylinder 22. The stroke adjustment cap 26 is provided with an air discharge hole 26a. A screw 27 is adapted to secure the stroke adjustment cap 26 to the cylinder 22 after the adjustment is completed.

Figure 2:
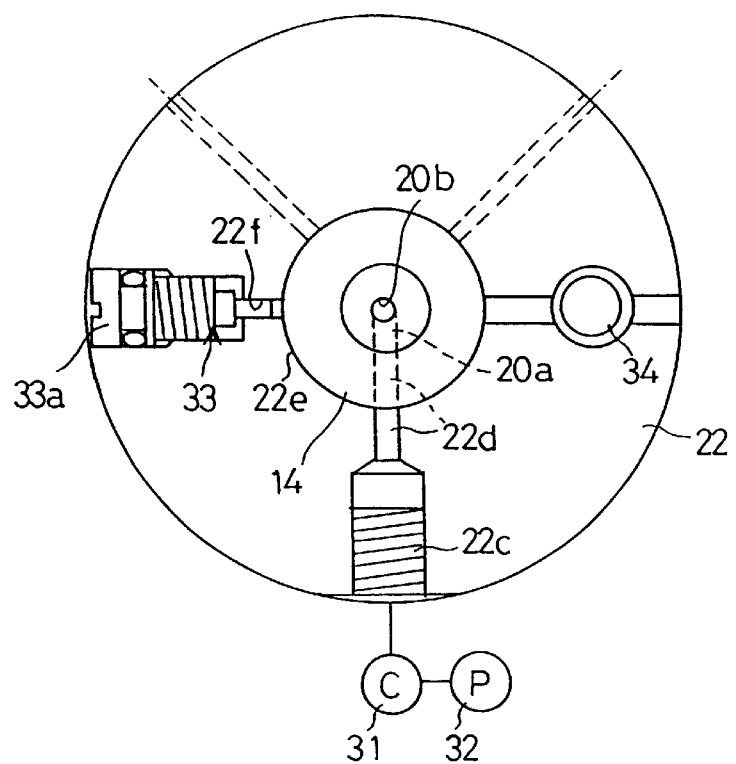
FIG. 2 is a sectional view taken along the line II—II in FIG. 1.

A pilot pressure chamber 29 for large flow rate is formed below the large flow rate piston 23L by the rod holder 14 and the cylinder 22. The pilot pressure chambers 29 and 28 for large and small flow rates receive a pilot pressure supplied from the same pilot pressure source 32 (FIG. 2) through a control valve 31. Namely, the cylinder 22 is provided with a pressure port 22c which is connected to the pilot pressure source 32 and is also connected to the pilot pressure chamber 28 for small flow rate, through a radial hole 22d of the cylinder 22 (rod holder 14), and a radial hole 20a, an axial hole 20b and a radial hole 20c of the valve stem 20. Also, the radial hole 22d is connected to the pilot pressure chamber 29 for large flow rate, through an annular gap 22e defined between the rod holder 14 and the cylinder 22, and a passage 22f formed in the cylinder 22.

The pressure port 22c, the radial hole 22d, the radial hole 20a, the axial hole 20b and the radial hole 20c form a small flow rate connection passage, in which no restriction valve to restrict the passageway is provided. Conversely, the radial hole 22d, the annular gap 22e and the passage 22f form a large flow rate connection passage, in which a restriction valve (needle valve/restrictor/metering valve/throttle butterfly)) 33 is provided. The restriction valve 33 restricts the sectional surface area of the passageway for the large flow rate down to, for example, several tenths or several hundredths, in comparison with the sectional surface area of the passageway for the small flow rate. Namely, the restriction of the passageway can be adjusted by the adjustment of the screw engagement position of the needle screw 33a. Note that cylinder 22 is provided with an air discharge port 22g through which the chamber above the large flow rate piston 23L is opened into the atmosphere. The pilot pressure chamber 29 for large flow rate is connected to the annular space 22e through a check valve 34. The check valve 34 does not permit the air to pass therethrough into the pilot pressure chamber 29 for large flow rate but permits the air (pressure) within the pilot pressure chamber 29 for large flow rate to pass therethrough in order to release the pressure.

The upward extremity of the movement of the large flow rate piston 23L is restricted by the abutment of the large flow rate piston 23L (or to be precise, the stop ring 24) against the cup-shaped separation wall member 40. The distance D between the large flow rate piston 23L and the cup-shaped separation wall member 40 is remarkably larger than the distance Δst (D 》 Δst).

The apparatus constructed as above operates as follows.

Figure 3:
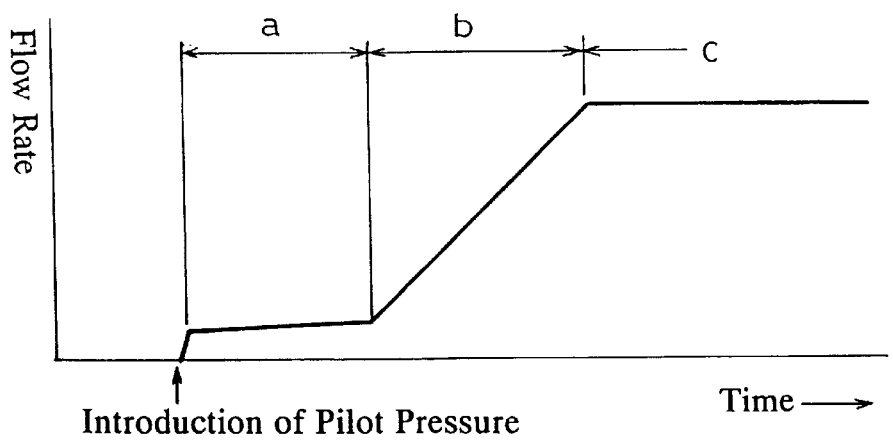
FIG. 3 is a graph showing flow rate characteristics of an automatic two-stage switching valve according to the present invention.

When no pilot pressure is introduced in the pressure port 22c, the valve stem 20 which is biased in the valve closing direction by the spring force of the compression spring 17 presses the metal diaphragm 16 onto the annular valve seat 13 to thereby close the passageway 12. To open the valve, the pilot pressure is introduced from the pilot pressure source 32 into the pressure port 22c via the control valve 31. Consequently, the pilot pressure immediately acts (indicated by an arrow S) on the pilot pressure chamber 28 for small flow rate, through the passageway for the small flow rate which is constituted by the pressure port 22c, the radial hole 22d, the radial hole 20a, the axial hole 20b, and the radial hole 20c. As a result, the small flow rate piston 23S is moved upward to the upward extremity at which the small flow rate piston 23S abuts against the stroke adjustment cap 26, by the displacement corresponding to the distance Δst. Consequently, the valve stem 20 is moved together upward, and hence the metal diaphragm 16 is slightly disengaged from the annular valve seat 13, so that a small flow rate can be obtained in the passageway 12 (section "a" in FIG. 3).

The pilot pressure applied to the pressure port 22c also acts (indicated by an arrow L) on the pilot pressure chamber 29 for large flow rate, through the passageway for the large flow rate, which is constituted by the radial hole 22d, the annular space 22e and the passage 22f. However, since the restriction valve (throttle valve) 33 is provided in the passageway for the large flow rate, the pressure in the pilot pressure chamber for large flow rate is raised with a delay. After the pressure within the pilot pressure chamber 29 for large flow rate reaches a predetermined value, further supply of the pilot pressure into the pilot pressure chamber 29 for large flow rate through the restriction valve 33 causes the large flow rate piston 23L to move upward so that the valve stem 20 is moved together upward. Consequently, the passageway 12 is gradually opened (section "b" in FIG. 3). When the large flow rate piston 23L abuts against the cup-shaped separation wall member 40, so that the upward movement of the piston is stopped, the large flow rate is constantly obtained (section "c" in FIG. 3).

When the air is discharged through the control valve 31 after the supply of the pilot pressure to the pressure port 22c is stopped, the small flow rate piston 23S, the large flow rate piston 23L and the valve stem 20 are returned to the respective initial positions by the spring force of the compression spring 17. Consequently, the air in the pilot pressure chamber 28 for small flow rate and in the pilot pressure chamber 29 for large flow rate is discharged to the atmosphere through the check valve 34.

Although the above-mentioned embodiment is applied to an opening and closing valve in which the valve stem 20 presses the metal diaphragm 16 that opens or closes the annular valve seat 13, the present invention can be applied to a metal bellows valve, or a valve structure in which the valve body is directly provided on the lower end of the valve stem 20, or a valve structure in which the movement of the valve stem 20 is transmitted to a valve body separate from the valve stem.

As may be understood from the above discussion, in an automatic two-stage switching valve according to the present invention, not only can the small flow rate and the large flow rate be switched by a single valve, but also the flow rate can be smoothly changed from the small flow rate to the large flow rate.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An automatic two-stage switching valve comprising:

a valve stem which normally closes a fluid passage by a spring force;

a cylinder adopted to accommodate said valve stem;

a large flow rate piston and a small flow rate piston that are provided on the valve stem and are slidably fitted in said cylinder;

a large flow rate pilot pressure chamber formed in the cylinder to exert a pilot pressure on the large flow rate piston against the biasing force of said spring force;

a small flow rate pilot pressure chamber formed in the cylinder to exert a pilot pressure on the small flow rate piston against the biasing force of said spring force;

a stopper adopted to restrict the movement of said small flow rate piston due to the pilot pressure by a predetermined amount;

a pilot pressure source adopted to apply the pilot pressure simultaneously to both the large flow rate pilot pressure chamber and the small flow rate pilot pressure chamber; and a restrictor provided in a connection passage that connects the pilot pressure source to the large flow rate pilot pressure chamber.

2. The automatic two-stage switching valve according to claim 1, wherein said cylinder is provided with an open end, and wherein said stopper comprises a cap that is screw engaged at the open end of said cylinder.

3. The automatic two-stage switching valve according to claim 1, wherein said restrictor restricts said pilot pressure applied to said large flow rate pilot pressure chamber so that said valve stem opens said fluid passage at a small flow rate and then gradually to a large flow rate.

4. An automatic two-stage switching valve comprising:

a valve stem which opens or closes a fluid passage;

a biasing spring for biasing the valve stem in a direction to close the fluid passage;

pistons for a large flow rate and a small flow rate, provided on the valve stem at different axial positions;

a cylinder in which the pistons for said large flow rate and said small flow rate are slidably fitted;

a pilot pressure chamber for said large flow rate, formed in the cylinder to exert a pilot pressure on the piston for said large flow rate in a direction opposite to the biasing direction of the biasing spring;

a pilot pressure chamber for said small flow rate, formed in the cylinder to exert a pilot pressure on the piston for said small flow rate in a direction opposite to the biasing direction of the biasing spring;

a small flow rate connection passage, for connecting the pilot pressure chamber for said small flow rate to a pilot pressure source;

a large flow rate connection passage, for connecting the pilot pressure chamber for said large flow rate to the pilot pressure source; and a restrictor provided in the large flow rate connection passage.

5. An automatic two-stage switching valve according to claim 4, further comprising a stopping device for restricting the movement of the piston for said small flow rate when the pilot pressure is introduced in the pilot pressure chamber for said small flow rate, wherein said valve stem is movable relative to the piston for said small flow rate in a valve opening direction when the movement of the piston for said small flow rate is restricted by the stopping device.

* * * * *